Patented Jan. 25, 1938

2,106,486

UNITED STATES PATENT OFFICE 2,106,486

THE PRODUCTION OF ANION-EXCHANGE RESINS FROM M-PHENYLENEDIAMINE

Willard H. Kirkpatrick, Chicago, Ill., assignor to National Aluminate Corporation, Chicago, Ill., a corporation of Delaware No Drawing. Application December 3, 1936, Serial No. 113,986

2 Claims. (Cl. 260—130)

The present invention relates to the preparation of a special form of resin from m-phenylenediamine and formaldehyde, which process is so controlled that a resin will be obtained that has marked properties of removing anions from solutions.

One of the objects of the invention is to condense m-phenylenediamine with formaldehyde in an acid medium under such conditions as to yield a final resinous gel which, by reason of the method of its preparation is possessed of the remarkable property of removing anions from solutions.

Such a resin, when properly prepared, will remove, for example, sulphate ions from water containing the same practically completely until it has become saturated with the sulphate ions, whereafter they can be removed from the resin by treatment with a dilute alkali, as for example ammonia. A solution of ammonia containing as little as 0.3% of $NH_3$ is sufficient for this purpose. While it has already been proposed to use aminoaldehyde condensation products for such a purpose, the resins produced in accordance with prior art methods did not possess sufficient adsorption capacity or surface to effect the desired results with any degree of efficiency, but by operating in accordance with the present invention the resin is first produced so as to be in the form of a very stiff gel which on subsequent drying dries down into a hard granule but still retains an enormous surface area so that it can perform its anion adsorbing effects.

It has been found that ordinary m-phenylenediamine contains impurities which in some way, not thoroughly understood, prevents formation of a resin of the desired properties. In other words, the m-phenylenediamine should be of a very high degree of purity, for otherwise, even though a resin be formed it may not have the desired properties. Therefore, it has been found advisable to produce a sufficiently pure form of m-phenylenediamine before carrying out the process hereinbelow described.

As an example of the practice of the present invention, but without limiting the same strictly thereto, it may be stated that it is found highly desirable to distill m-phenylenediamine under reduced pressure, as for example in a vacuum, so as to obtain a freshly distilled and very pure m-phenylenediamine.

Fifty parts by weight of freshly distilled m-phenylenediamine are dissolved in 500 parts by weight of water and 148 parts by weight of concentrated hydrochloric acid. The resultant mixture is boiled for a few minutes, at least long enough to insure the complete solution of the m-phenylenediamine and the resultant formation of m-phenylenediamine dihydrochloride. This solution is then permitted to cool to slightly below the boiling point but not lower than, say, about 70° C., whereupon there are added, as rapidly as possible, 100 parts by weight of commercial formaldehyde containing about 40% of $CH_2O$. The introduction of the formaldehyde must be accomplished while stirring most vigorously in order to insure the complete and rapid incorporation of the formaldehyde with the solution. Within a few minutes thereafter the entire material will set in the form of a stiff gel of the condensation product produced. This gel is then broken up, and any liquid adhering thereto is allowed to drain off. However, it is not washed, but dried at a temperature not exceeding 115° C.

This yields about 50 parts by weight of a dark colored, almost black, resinous material which may be used for the purpose of removing anions from water in the manner above indicated.

I claim:

1. The process of producing a special type of m-phenylenediamine resin which comprises dissolving freshly distilled m-phenylenediamine in sufficient concentrated hydrochloric acid to form a solution of m-phenylenediamine dihydrochloride containing a slight excess of free acid, adding formaldehyde thereto, allowing the resultant mixture to form a gel, breaking up the gel, and drying the same at a temperature not exceeding 115° C.

2. The process of producing a special type of m-phenylenediamine resin which comprises dissolving 50 parts by weight of freshly distilled m-phenylenediamine in about 500 parts by weight of water and about 148 parts by weight of concentrated hydrochloric acid, boiling the solution for a few minutes and then adding thereto at a temperature between 70° and 100° C. about 100 parts by weight of 40% formaldehyde while stirring the material, allowing the mixture to set into a gel, breaking up the gel, and drying the same at a temperature not exceeding 115° C.

WILLARD H. KIRKPATRICK.